May 19, 1925.　　　　　　　　　　　　　　1,538,737
P. O'FLYNN
SHOCK ABSORBING DEVICE
Filed April 28, 1924　　　2 Sheets-Sheet 1
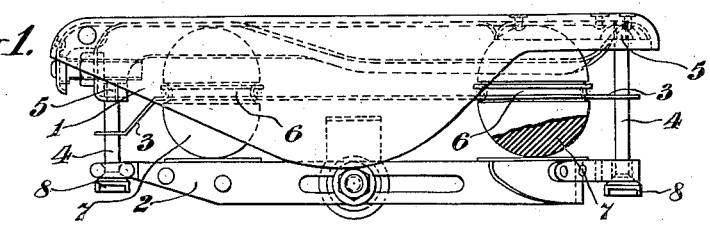
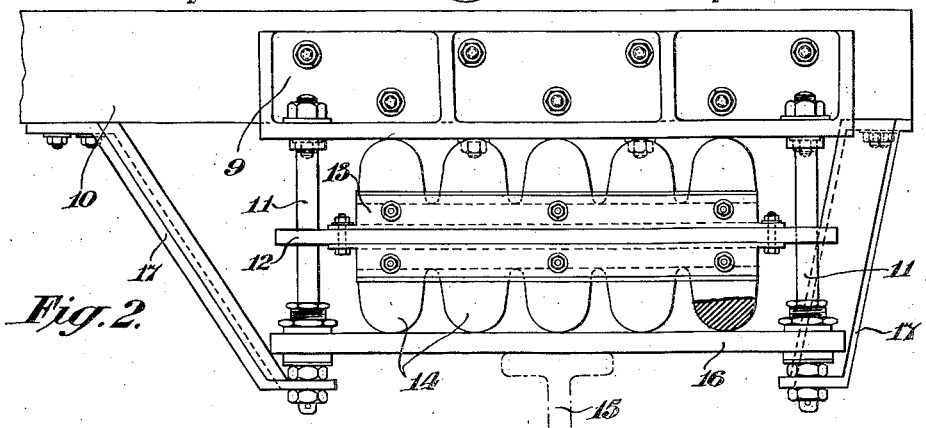
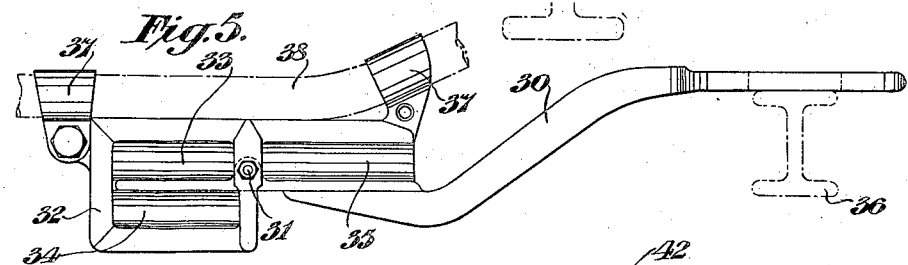
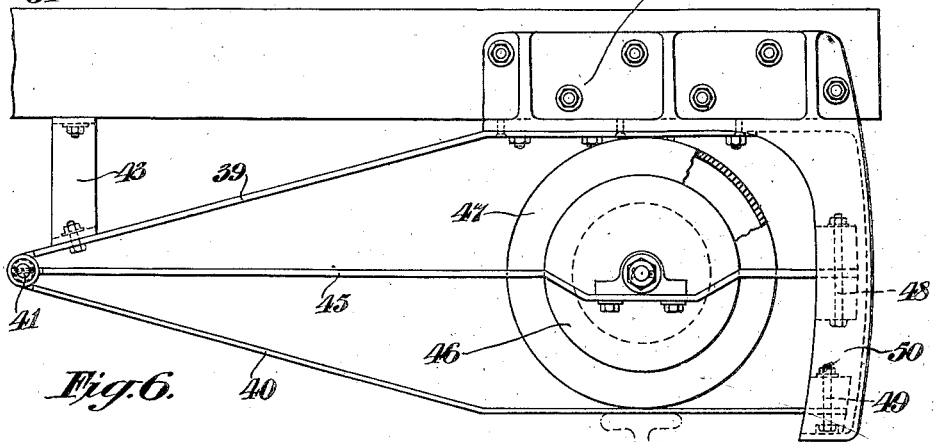
INVENTOR
PATRICK O'FLYNN May 19, 1925. 1,538,737
P. O'FLYNN
SHOCK ABSORBING DEVICE
Filed April 28, 1924 2 Sheets-Sheet 2
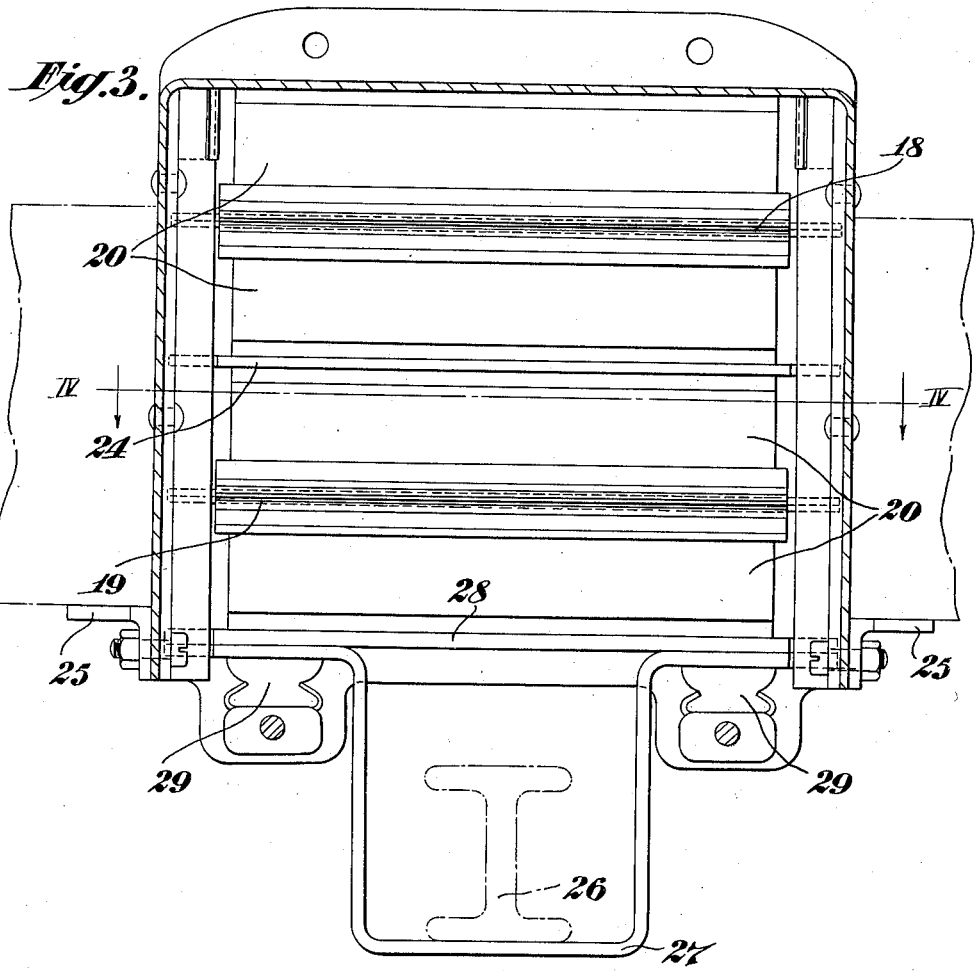
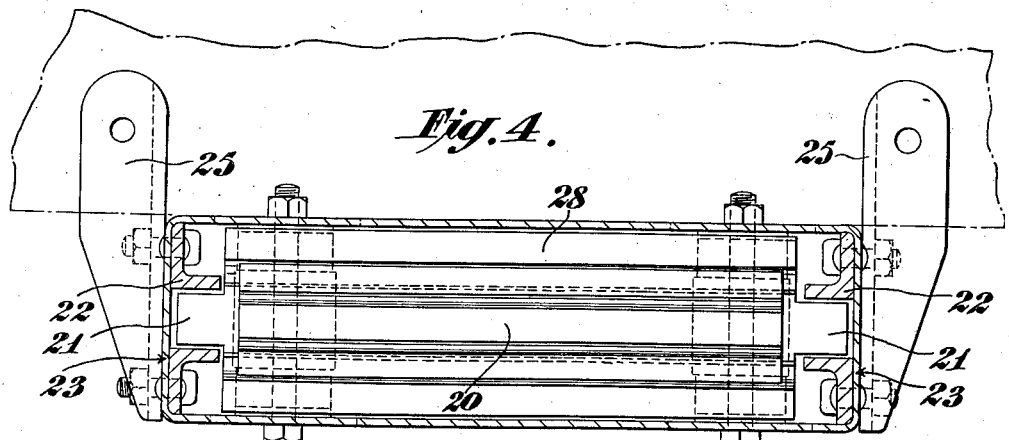
INVENTOR
PATRICK O'FLYNN Patented May 19, 1925.

1,538,737

UNITED STATES PATENT OFFICE.

PATRICK O'FLYNN, OF PIRBRIGHT, ENGLAND.

SHOCK-ABSORBING DEVICE.

Application filed April 28, 1924. Serial No. 709,670.

*To all whom it may concern:*

Be it known that I, PATRICK O'FLYNN, a citizen of the Irish Free State, and a resident of Pirbright, county of Surrey, England, have invented a certain new and useful Improvement in Shock-Absorbing Devices, of which the following is a specification.

This invention relates to shock-absorbing devices for absorbing shocks between relatively moving parts, serving as a buffer therebetween, and provides apparatus to serve in lieu of springs as usually provided for the purpose.

According to my invention I provide a floating member which carries on each of its sides blocks or hollow casings of rubber or other resilient material which are adapted to be compressed in absorbing shocks. Said blocks or casings may be in the form of either solid blocks or pneumatic compartments adapted to be inflated to a pressure.

The floating member may, according to the varying applications of the invention, be in the form of a simple floating plate carrying the blocks or the like on each of its sides, or a pivoted lever carrying the blocks, and may be of rod, wire, plaited wire, flat metal or a section metal bar, and in either case may be of a springy nature, and the solid or hollow rubber or like buffers may extend through or around the latter so that each one serves a buffer on each side of said floating member.

In the case of separate buffer blocks or casings on the respective sides of the floating member, such blocks or casings may be constructed with beads engaging in rims or flanges on said member, to constitute a retaining means, or may be received into box-like compartments provided on said floating member. Alternatively, in the case of blocks, flanges may be provided on the floating member, with holes for screws or the like to pass through to engage into the blocks.

Amongst other applications of the invention, it is particularly applicable to road or track vehicles as a spring suspension means, in place of the usual suspension springs, and in another application to a vehicle saddle.

The invention will be the more readily understood by reference to the accompanying sheets of drawings, wherein:—

Figure 1 represents a saddle in side elevation, embodying my invention.

Figure 2 apparatus embodying my invention, for absorbing shocks between the road or track wheel and chassis of a vehicle.

Figure 3 a vertical side elevation of enclosed apparatus, being a modification of that shown in Figure 1; and Figure 4 a sectional plan on line IV—IV in Figure 3.

Figure 5 is a side view of a modified form of apparatus for absorbing shocks between the road or track wheel axle and chassis; and, Figure 6 is a side view of a still further modified form of apparatus for the same purpose.

Referring to Figure 1, there is arranged between the seat 1 of the saddle, and the lower part 2 affixed to the vehicle or machine, a floating member 3 mounted on parallel vertical pillars 4 fixed at their upper ends at the points 5. The floating member 3 is of wire, rod, or metal strip, and is looped or constructed to form loops or orifices 6. Said loops or orifices encircle balls or blocks 7 of rubber or the like, which are peripherally grooved to receive the floating member 3. The lower part 2 which is affixed to the vehicle or machine is floatably mounted on the pillars 4, stops 8 being provided at the bottom of said pillars.

Referring to Figure 2, a right angle section plate 9 is affixed to the vehicle chassis side frame 10, and parallel vertical pillars 11 are affixed to the horizontal flange of the plate 9, extending downwardly. The floating member consists of a plate 12 mounted on the pillars 11, said plate carrying cheeks 13 which between them form channels in which are affixed rubber or like blocks, one each side of the floating member 12, said blocks each being formed with projections 14. The upper surface of the road or track wheel axle 15 bears against the underside of the plate 16 which is floatably mounted on the pillars 11. The stays 17 support the pillars 11 at their lower ends.

The form of apparatus illustrated in Figures 3 and 4 is somewhat similar in construction to that illustrated in Figure 2, but is enclosed in a box-like casing, the front wall being shown broken away in Figure 3. In this construction the floating member is in two parts comprising plates 18 and 19, each of which have rubber or like blocks 20 secured on each of their sides. Each of said plates are of reduced width at their ends, forming tongues 21, and said tongues travel in vertical grooves formed between right angular strips 22, interiorly secured to the end walls 23 of the box casing. A floating plate 24 may separate the two sets of buffers. The apparatus is secured by the lugs 25 on the vehicle chassis and the road or track wheel axle 26 is fixedly housed within the bracket 27 which is mounted to a plate 28 of similar shape to the floating members 18, 19, and free to float within the casing. Rubber or like cushions 29 are provided for taking the rebound action.

It is to be understood that any combination of the two constructions shown in Figure 2 and in Figures 3 and 4 respectively may be adopted, or in either construction the inner movable parts may be only partly encased.

In the construction of apparatus shown in Figure 5, the floating member is in the form of a lever 30, pivoted at 31, and 32 represents a frame which holds rubber or like blocks 33, 34 and 35. Upward movement of the road or track wheel axle 36 causes the lever to turn about the pivot 31, and compress the blocks 34 and 35. The block 33 serves for rebound purposes. The lugs 37 of the frame 32 are clamped to a part 38 of the chassis.

The apparatus illustrated in Figure 6, intended to replace transverse or other part elliptical shaped spring, is of triangular form, comprising outer plates 39, 40, hinged together at 41. The plate 39 is fixed to the bracket 42 clamped to the chassis frame, and supported by lug 43, and the road or track wheel axle 44 bears under the plate 40. The floating member 45 is also hinged at 41 and carries a circular buffer 46 having a tyre of rubber or the like 47. The free ends of the floating member 45, and of the plate 40 are mounted to float on the pins 48 and 49 respectively in the extension piece 50 of the bracket 42.

In all of the constructions described it is preferred to use sponge rubber or solid rubber as the shock-absorbing medium, being of square, rounded, tapering, or other desired cross-sectional shape.

Springing devices constructed according to my invention possess the advantage of elimination of friction, and consequently, silence of operation, as compared with, say, laminated springs.

I claim:—

1. A shock absorbing construction for vehicles including a relatively fixed member having guide means, a relatively movable member engaging said guide means, a floating member also engaging said guide means and arranged between said first named members, and resilient elements embraced by said floating means and constituting a spring buffer between said relatively fixed and movable members.

2. A shock absorbing construction for vehicles including a relatively fixed member having vertical guide means, a relatively movable member slidably engaging said guide means, and an intermediate resilient unit comprising a floating member also slidably engaging said guide means and embracing and carrying therewith compressible elements having a bearing engagement with said relatively fixed and movable members.

3. A shock absorbing construction for vehicles and the like including relatively fixed and movable members, parallel vertical pillars carried by one of said members, buffers of resilient material arranged between said movable members and a floating member engaging said pillars and also embracing said buffers.

4. A shock absorbing construction for vehicles including a body constituting a relatively fixed member and a chassis part constituting a relatively movable member, guide elements rigidly carried by the body and a resilient unit mounted between the body and the chassis part and having compressible elements attached thereto respectively bearing against the body and the chassis part, said resilient unit having extension elements for engaging said guide means carried by the body.

5. A shock absorbing construction for vehicles and the like comprising a body part constituting a relatively fixed member and a chassis part constituting a relatively movable member, fixed vertical guide members rigidly carried by the body part and the said chassis part being slidable on said guide members, and a resilient unit including a floating frame slidably engaging the said guide elements and having resilient members attached thereto respectively engaging with the body and chassis part.

In testimony whereof I have affixed my signature hereto this 14th day of April, 1924.

PATRICK O'FLYNN.